United States Patent [19]

Otsuka

[11] Patent Number: 4,731,500

[45] Date of Patent: Mar. 15, 1988

[54] ELECTRICAL SHIELDING TAPE AND METHOD OF MAKING SAME

[75] Inventor: Hiraaki Otsuka, Kobe, Japan

[73] Assignee: The Zippertubing Company, Los Angeles, Calif.

[21] Appl. No.: 819,619

[22] Filed: Jan. 17, 1986

[30] Foreign Application Priority Data

Feb. 14, 1985 [JP] Japan .................................. 60-27799

[51] Int. Cl.⁴ ............................ H01B 7/08; B32B 7/04

[52] U.S. Cl. ................................ 174/36; 174/35 GC; 174/35 MS; 174/115; 174/117 A; 428/254

[58] Field of Search ............... 174/36, 35 MS, 35 GC, 174/109, 115, 117 A, 117 M; 428/254

[56] References Cited

U.S. PATENT DOCUMENTS

| | | | |
|---|---|---|---|
| 3,026,367 | 3/1962 | Hartwell | 174/35 GC |
| 3,312,769 | 4/1967 | Lakaff | 174/35 GC |
| 3,502,784 | 3/1970 | Kunkel | 174/35 GC |
| 3,757,087 | 9/1973 | Bernard | 174/117 A X |
| 4,189,618 | 2/1980 | Bretts et al. | 174/35 MS |
| 4,200,126 | 4/1980 | Fish | 174/109 X |
| 4,251,712 | 2/1981 | Parr | 174/117 A X |
| 4,510,346 | 4/1985 | Bursh, Jr. et al. | 174/115 X |

FOREIGN PATENT DOCUMENTS

| | | | |
|---|---|---|---|
| 1448820 | 9/1976 | United Kingdom | 174/109 |

*Primary Examiner*—Morris H. Nimmo

*Attorney, Agent, or Firm*—Christie, Parker & Hale

[57] ABSTRACT

Disclosed is flexible electrical shielding and a method of making the same for self-adherent assembly to an object to protect the object from electrical fields and static. The shielding comprises a nonconductive strip embraced by a flattened tube of conductive wire netting held in place by a layer of tacky adhesive applied to one exterior face of the netting tube and the adjacent side of the nonconductive strip. Anchorage of the tacky layer is facilitated by using a thermoplastic material and depressing portions thereinto under pressure while the strip is temporarily heat softened. A bare conductor extends along and in contact with the interior of the tube of netting and serves as a grounding conductor for the shielding. The shielding is applied to cabling or an object by spirally wrapping it about cabling, a wire harness or by applying it to the surface of an object to be shielded.

11 Claims, 4 Drawing Figures

FIG. 1
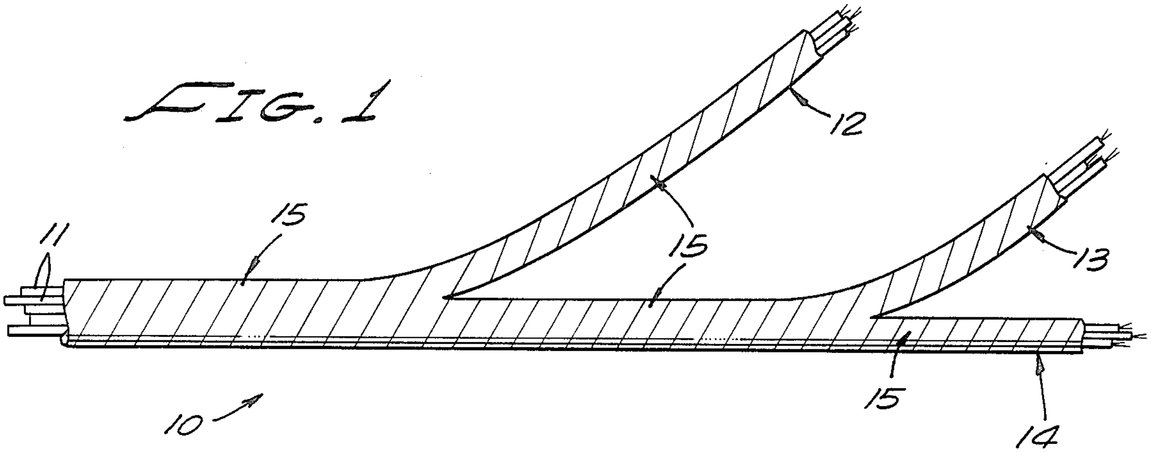
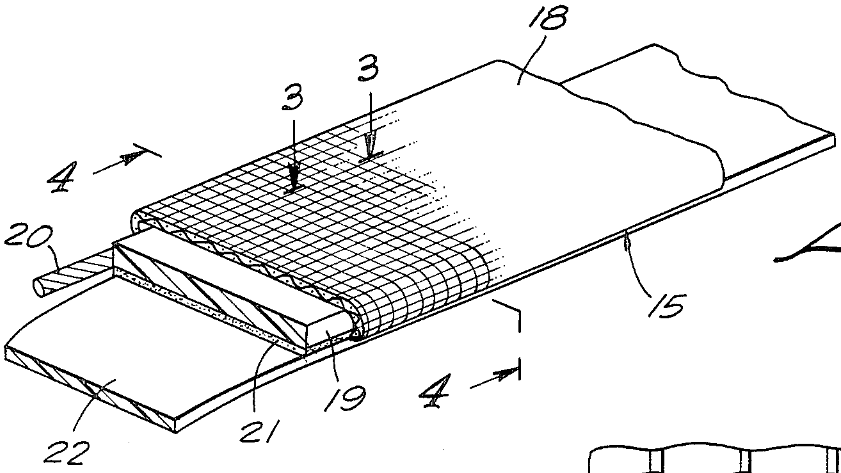
FIG. 2
FIG. 3
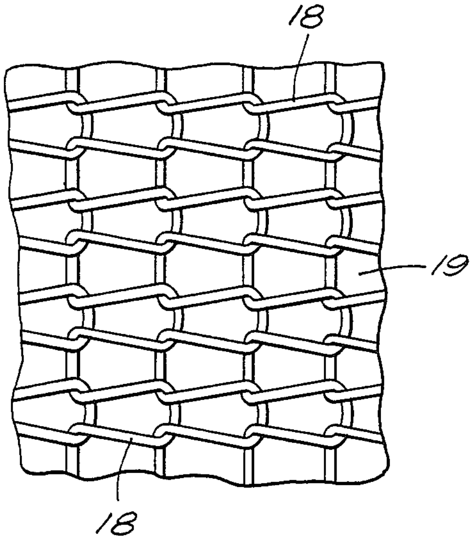
FIG. 4
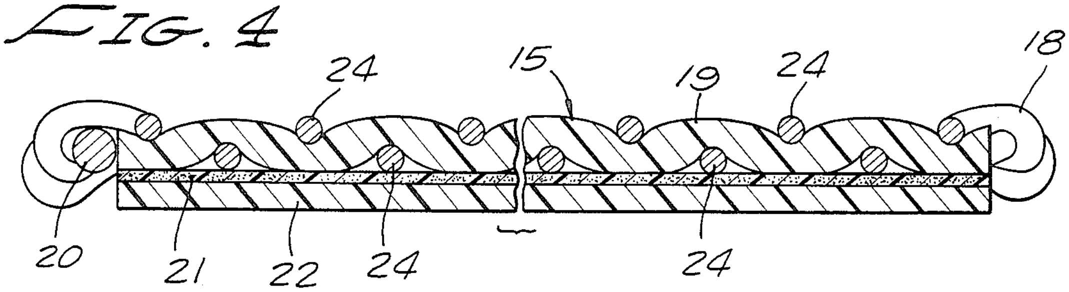

ELECTRICAL SHIELDING TAPE AND METHOD OF MAKING SAME

This application relates to electrical shielding, and more particularly to a unique shielding tape and method of making the same comprising a flattened tube of conductive netting embracing a nonconductive strip and having a tacky external layer of adhesive for holding the shielding assembled to cabling or an object in need of electrical shielding.

BACKGROUND OF THE INVENTION

Various proposals and practices have been utilized heretofore to protect objects, cabling and wire harness from electrical fields and static. These include the use of metal foil held wrapped about cabling by double sided adhesive tape. The foil wrapping interferes objectionably with the flexibility of the cabling. Another technique involves enclosing cabling with braided wire sleeving but this mode is objectionably costly for short production runs. A third mode utilizes conductive netting held wrapped about the cabling by double sided adhesive. Such adhesive adheres so unreliably to the netting that it has been the practice to apply the adhesive to half the width of the netting and then utilizing two semi-overlapping convolutions of the shielding to hold it in assembled position. This mode is costly in labor and material and results in reduced shielding effectiveness.

SUMMARY OF THE INVENTION

The above mentioned and other shortcomings of prior shielding practices are avoided by this invention by utilizing a nonconductive strip installed within the flattened tube of conductive wire netting to provide a more effective anchorage for a layer of tacky adhesive applied against one exterior side of the flattened tube of netting. Firm anchorage of the tacky adhesive to the shielding is very substantially aided by heating the plastic strip to soften it while applying pressure to depress portions of the netting into the strip with the exterior thereof lying virtually flush with the surface of the netting. In consequence the tacky layer has a major proportion of the tacky layer surface is in strong direct contact with the strip to which it adheres more tenaciously than it does to the wire netting. Preferably a conductive grounding wire is enclosed within the flatted tube and in direct contact with the netting. Prior to the application of the shielding tape to cabling or the like the tacky layer is preferably protected by the application of a readily removable guard strip which can be detached just prior to the application of the shielding to an object. If dual wrappings of the shielding are applied it is desirable that the outer layer be applied under sufficient tension that the wire netting of the underlying convolution to cut through its tacky layer of the overlying convolution so as to make electrical contact therewith to increase the shielding effectiveness and efficiency.

Referring now to the drawing in which a preferred embodiment of the invention is illustrated:

FIG. 1 is a view of a wire harness having its main trunk and each branchout shielded by a spiral wrapping of the self-adherent shielding tape of this invention;

FIG. 2 is a fragmentary view on an enlarged scale of a short length of the shielding tape shown in FIG. 1;

FIG. 3 is a cross sectional view on an enlarged scale taken along line 3—3 on FIG. 2.

FIG. 4 is a cross sectional view on an enlarged scale taken along line 4—4 on FIG. 2.

Referring initially to FIG. 1, there is shown a typical wire harness, designated generally 10, comprising a plurality of insulated conductors 11 secured together by thonging in known manner and including branchouts 12, 13 and 14 at various points along the main trunk of the harness. The main trunk as well as each branchout is shown snugly enclosed by spiral wrappings of the invention shielding assembly 15.

FIGS. 2 and 3 show the structural details of the shielding assembly 15 which comprises a flattened tube 18 of knitted ductile conductive wire embracing a thin flat strip 19 of thermoplastic material and a bare conductive grounding wire 20 lying along one lateral edge of strip 19. For convenience, this knitting tube is hereinafter designated netting. The other two components of the assembly include a layer of tacky adhesive 21 applied along one exterior side of the flattened tube of netting and is preferably protected on its exposed side by a readily removable guard strip 22. Netting 18 may be formed of interwoven strands of annealed copper, aluminum, tinned copper, nickel copper alloy, iron copper alloy, iron, or other metal material selected to satisfy a particular shielding purpose. This conductive wire is knitted into a flexible flattened tube in a known manner as is shown in the magnified portion of netting 18 shown in FIG. 3. Such netting evidences extreme elasticity and flexibility. The size of the mesh can be selected arbitrarily. Typically and for most shielding purposes, an individual mesh spans an area between 0.5 and 5 square millimeters. The width of the flattened tube can vary widely between arbitrarily selected widths ranging between several millimeters to several meters; however, a width of 8–10 millimeters is typical.

The thermoplastic or resin strip 19 can be selected from a wide range of thermoplastic materials of which polyvinylchloride or one of its copolymers is satisfactory and advantageous both functionally, ease of processing and costwise. Preferably netting 18 is constructed progressively lengthwise of and about strip 19 and grounding wire 20 althrough the latter may be inserted after the netting tube has been formed.

The flattened tube 18, strip 19 and conductor 20 having been constructed into a unitary assembly, the next step is to impress portions of the netting into the adjacent surfaces of strip 19. This operation is accomplished by heating strip 19 to a state of semifused or softened condition and then subjecting the assembly to pressure to depress portions of the netting strands 24 into strip 19. When so depressed, portions 24 of the netting will lie substantially flush with the adjacent outer surface of strip 19. When the strip cools the netting remains permanently in the depression in this general configuration. Depression of the netting into the tape is readily accomplished by passing the netting and the heat softened strip 19 between rollers and then cooling the strip. It will be understood that rubber compounds can be used in lieu of the thermoplastic material if so desired.

The final step in the manufacturing of the shielding assembly is to apply a layer of tacky adhesive 21 to one exterior side of the flattened netting. This layer can be prepared from a basic tacky adhesive and/or if necessary a tackifier, a softener and an age resister in well known appropriate ratios. Natural or synthetic rubber, tacky adhesive or acrylic tacky adhesive can be used as the basic tacky adhesive along with a tackifier, rosin, ester gum, polyterpene resin, petroleum resin, styrene resin, alkylphenol resin, etc. The softening agent may comprise various plasticisers polybutene, liquid resin tackifier, low grade polymer of polyisobutylene and other well known softeners. The adhesive may be applied either as a liquid or as a paste. The adhesive adheres tenaciously to strip 19. This strip is preferably quite thin so that the surfaces of the netting on the opposite sides of the strip are as close as possible to one another and able to function efficiently and effectively as a shielding assembly.

The above described shielding tape assembly is useful as an electromagnetic wave shielding tape or as a static electricity shielding tape for a wide variety of shielding applications. These include wrapping a wire harneses with convolutions of the shielding with their adjacent lateral edges in direct contact with one another and utilizing the exposed tacky adhesive 21 to hold the shielding material snugly in place without need for other retainers. The shielding assembly can also be applied over the entire component in need of shielding as well as about cable splices where the shielding layers of the cables being spliced are inadequate to embrace fully and satisfactorily the spliced conductors. The gaps between the main cable shielding layers can then be bridged by applying convolutions of the invention shielding tape 15. Although FIG. 1 shows adjacent convolutions in direct edge-to-edge contact it is also feasible and effective to partially overlap adjacent convolutions. Shielding tape 15 applied about branch outs of wire harnesses utilize either the same tape used to shield a trunk portion of the harness or a separate tape. If a separate tape is used for the branch out then it is desirable that the grounding conductor 20 of a branch out be connected to the grounding wire of an adjacent convolution of tape being wrapped about another portion of the harness. One end of the ground wire 20 is then connected to a grounded terminal in accordance with known grounding practice for a shielding assembly.

While the particular electrical shielding tape and method of making same herein shown and disclosed in detail is fully capable of attaining the objects and providing the advantages hereinbefore stated, it is to be understood that it is merely illustrative of the presently preferred embodiment of the invention and that no limitations are intended to the detail of construction or design herein shown other than as defined in the appended claims.

I claim:

1. An article of manufacture for use in providing an electrical shield between an object and ambient electrical flux comprising:

flattened tubular wire netting of conductive material having gaps between the wires and embracing a flat nonconductive strip extending therethrough; and a layer of tacky adhesive applied to the exterior of one side of said flattened netting and to the side of said strip adjacent to the one side of the netting and adapted to hold said netting firmly affixed to the surface of an object to shield the object from ambient electrical flux.

2. An article of manufacture as defined in claim 1 characterized in that said nonconductive strip comprises plastic material.

3. An article of manufacture as defined in claim 1 characterized in that said tacky adhesive is protected prior to use to hold said netting to an object by a readily removable protective guard strip.

4. An article of manufacture as defined in claim 1 characterized in that said netting and said nonconductive strip are sufficiently flexible to be wrapped about an object with at least a portion of said tacky adhesive in direct contact with the surface of said strip and the surface of said object.

5. An article of manufacture suitable for wrapping around a wire harness to shield the same against ambient electrical flux and static, said article comprising:

flattened tubular netting formed of flexible conductive wire having gaps between wires and embracing a flat nonconductive strip anchored to one side of said flattened netting by a layer of tacky adhesive at least partly external to the netting, said article of manufacture being adapted to be snugly spirally wrapped about a wire harness and held firmly assembled thereto by said tacky adhesive to provide a continuous electrical shield for said harness.

6. An article of manufacture as defined in claim 5 characterized in the presence of a continuous electrical conductor extending along the interior of said tubular netting and in direct contact therewith.

7. An article of manufacture as defined in claim 5 characterized in the provision of a readily removable guard strip applied to the exterior of said tacky layer to safeguard the latter until said article of manufacture is ready for application to a wire harness.

8. An article of manufacture suitable for assembly about a wire harness to shield the same against ambient electrical flux and static, said article comprising:

flattened tubular netting formed of flexible conductive wire having gaps between wires and embracing a nonconductive strip anchored to one side of said flattened netting by a layer of tacky adhesive at least partly external to the netting, said wire netting having portions thereof depressed into said nonconductive strip so that said depressed portions of said netting lie generally flush with the outer portions of said depressed netting whereby major portions of said layer of tacky adhesive is in direct contact with said conductive strip, said article of manufacture being adapted to be snugly spirally wrapped about a wire harness and held firmly assembled thereto by said tacky adhesive to provide a continuous electrical shield for said harness.

9. An electrically conductive, self adhesive tape for affixing to the surface of an object to shield the object from ambient electrical flux comprising:

a nonconductive flat strip;

a tubular netting of conductive wire surrounding the strip and flattened against the first and second faces of the strip; and a layer of tacky adhesive on the exterior of a first side of the flattened tubular netting adjacent the first side of the strip and bridging gaps in the netting to contact the first side of the surrounded strip.

10. A tape as recited in claim 9 further comprising a removable protective guard strip temporarily adhered to the face of the adhesive opposite to the netting.

11. A tape as recited in claim 9 wherein the netting on at least the first side of the strip is at least partially embedded in the strip.

* * * * *